US011843566B2

(12) United States Patent  
Beeman et al.

(10) Patent No.: US 11,843,566 B2
(45) Date of Patent: *Dec. 12, 2023

(54) DYNAMIC CONTENT DELIVERY

(71) Applicant: Zeta Global Corp., New York, NY (US)

(72) Inventors: Stefan Beeman, San Francisco, CA (US); Gordon Michael Green, San Francisco, CA (US); Christian Monberg, San Francisco, CA (US); Neeraj Gore, San Francisco, CA (US)

(73) Assignee: Zeta Global Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/865,022

(22) Filed: Jul. 14, 2022

(65) Prior Publication Data

US 2022/0353218 A1 Nov. 3, 2022

Related U.S. Application Data

(63) Continuation of application No. 16/933,917, filed on Jul. 20, 2020, now Pat. No. 11,425,066, which is a
(Continued)

(51) Int. Cl.
*H04L 51/063* (2022.01)
*H04L 51/10* (2022.01)
(Continued)

(52) U.S. Cl.
CPC ....... *H04L 51/063* (2013.01); *G06Q 30/0201* (2013.01); *G06Q 30/0244* (2013.01);
(Continued)

(58) Field of Classification Search
CPC ............... G06Q 30/02; G06Q 30/0251; G06Q 30/0257; G06Q 30/0277; H04L 51/063;
(Continued)

(56) References Cited

U.S. PATENT DOCUMENTS 10,778,620 B1 9/2020 Beeman et al.
11,425,066 B2 8/2022 Beeman et al.
(Continued)

OTHER PUBLICATIONS

"U.S. Appl. No. 15/380,815, Advisory Action dated Jul. 26, 2019", 3 pgs.
(Continued)

*Primary Examiner* — Barbara B Anyan
(74) *Attorney, Agent, or Firm* — Schwegman Lundberg & Woessner, P.A.

(57) ABSTRACT

Dynamic content can be delivered via email. Email messages include HTML content with one or more hyperlinks referring to a network-connected dynamic content server. The hyperlinks are accessed upon rendering of the email on a client device, triggering a request to a dynamic content server. The dynamic content server determines a content item to be served in response to the request. The dynamic content item determination may be based on factors including the identity of the requester, the email communication in which the hyperlink is embedded, recent activities or behavior on the part of the requester, and/or known preference or demographic information associated with the requester. The request can be directed to a selected content item stored within a content delivery network, for transmission back to the requester and display to the user within the email.

20 Claims, 5 Drawing Sheets

Related U.S. Application Data continuation of application No. 15/380,815, filed on Dec. 15, 2016, now Pat. No. 10,778,620.

(60) Provisional application No. 62/267,891, filed on Dec. 15, 2015.

(51) Int. Cl.
| | |
|---|---|
| *G06Q 30/0251* | (2023.01) |
| *G06Q 30/0242* | (2023.01) |
| *H04L 67/02* | (2022.01) |
| *G06Q 30/0241* | (2023.01) |
| *G06Q 30/0201* | (2023.01) |
| *H04L 51/48* | (2022.01) |
| *H04L 51/212* | (2022.01) |
| *H04L 67/568* | (2022.01) |
| *H04L 67/564* | (2022.01) |

(52) U.S. Cl.
CPC ..... *G06Q 30/0255* (2013.01); *G06Q 30/0261* (2013.01); *G06Q 30/0271* (2013.01); *G06Q 30/0276* (2013.01); *H04L 51/10* (2013.01); *H04L 51/212* (2022.05); *H04L 51/48* (2022.05); *H04L 67/02* (2013.01); *H04L 67/564* (2022.05); *H04L 67/568* (2022.05)

(58) Field of Classification Search
CPC ... H04L 67/2823; H04L 67/306; H04L 51/00; H04L 51/08; H04L 51/10; G06F 17/21; G06F 17/30424; G06F 3/0484; G06F 2221/00
See application file for complete search history.

(56) References Cited

U.S. PATENT DOCUMENTS

| | | | | |
|---|---|---|---|---|
| 2003/0154256 | A1* | 8/2003 | Hadano | H04L 29/06 709/206 |
| 2004/0073482 | A1* | 4/2004 | Wiggins | G06Q 30/0252 705/14.66 |
| 2007/0282956 | A1* | 12/2007 | Staats | G06Q 10/107 709/206 |
| 2008/0091517 | A1* | 4/2008 | Koonce | G06Q 30/02 705/14.42 |
| 2009/0228360 | A1* | 9/2009 | Mancarella | G06Q 30/02 705/26.1 |
| 2010/0042592 | A1* | 2/2010 | Stolz | G06Q 30/02 707/E17.014 |
| 2013/0212200 | A1* | 8/2013 | Dennis | H04L 61/1511 709/206 |
| 2013/0227033 | A1* | 8/2013 | Tanaka | H04L 51/28 709/206 |
| 2014/0006158 | A1* | 1/2014 | Cooper | G06Q 30/02 705/14.56 |
| 2014/0026048 | A1* | 1/2014 | Spirer | G06F 3/0484 715/716 |
| 2014/0046976 | A1* | 2/2014 | Zhang | G06Q 30/0255 707/772 |
| 2015/0067819 | A1* | 3/2015 | Shribman | H04L 67/02 726/12 |
| 2015/0089602 | A1* | 3/2015 | Murphy | H04L 51/063 726/4 |
| 2015/0134450 | A1* | 5/2015 | Castelli | G06Q 30/0255 705/14.53 |
| 2015/0163311 | A1* | 6/2015 | Heath | G06Q 30/0201 709/204 |
| 2015/0213512 | A1* | 7/2015 | Spievak | G06Q 30/0275 705/14.71 |
| 2015/0254732 | A1* | 9/2015 | Snyder | G06Q 30/0276 705/14.72 |
| 2015/0310488 | A1* | 10/2015 | Hess | H04L 67/00 705/14.55 |
| 2016/0082348 | A1* | 3/2016 | Kehoe | G06Q 10/101 463/31 |
| 2020/0374247 | A1 | 11/2020 | Beeman et al. | |

OTHER PUBLICATIONS

"U.S. Appl. No. 15/380,815, Final Office Action dated Feb. 20, 2020", 15 pgs.

"U.S. Appl. No. 15/380,815, Final Office Action dated May 1, 2019", 13 pgs.

"U.S. Appl. No. 15/380,815, Non Final Office Action dated Oct. 2, 2019", 14 pgs.

"U.S. Appl. No. 15/380,815, Non Final Office Action dated Oct. 4, 2018", 23 pgs.

"U.S. Appl. No. 15/380,815, Notice of Allowance dated May 13, 2020", 7 pgs.

"U.S. Appl. No. 15/380,815, Response filed Jan. 18, 2019 to Non-Final Office Action dated Oct. 4, 2018", 12 pgs.

"U.S. Appl. No. 15/380,815, Response filed Nov. 5, 2019 to Non-Final Office Action dated Oct. 2, 2019", 12 pgs.

"U.S. Appl. No. 15/380,815, Response filed Jun. 25, 2019 to Final Office Action dated May 1, 2019", 10 pgs.

"U.S. Appl. No. 16/933,917, Non Final Office Action dated Dec. 22, 2021", 7 pgs.

"U.S. Appl. No. 16/933,917, Notice of Allowance dated Apr. 19, 2022", 9 pgs.

"U.S. Appl. No. 16/933,917, Response filed Feb. 7, 2022 to Non Final Office Action dated Dec. 22, 2021", 7 pgs.

\* cited by examiner

DYNAMIC CONTENT DELIVERY

RELATED APPLICATIONS

This application is a continuation of U.S. patent application Ser. No. 16/933,917, filed Jul. 20, 2020, which application is a continuation of U.S. patent application Ser. No. 15/380,815, filed Dec. 15, 2016, which application claims priority to U.S. Provisional Patent Application Ser. No. 62/267,891 filed Dec. 15, 2015, which applications and publications are incorporated herein by reference in their entirety.

TECHNICAL FIELD

The present disclosure relates in general to data processing systems, and in particular to systems and methods for dynamic delivery of content via email.

BACKGROUND

Email is one of the most prevalent forms of communication amongst individuals via the Internet. Traditionally, email messages are created by an originating user, and transmitted via the originating user's Internet-connected email server, to a receiving user's Internet-connected email server. In some circumstances, the recipient's email server may then, periodically, deliver copies of the message to an email client application, which may be operating on or via one or more of the recipient's personal electronic devices. The recipient can then use one or more electronic devices implementing email clients in order to view the received messages. In some circumstances, a web mail client associated with the recipient's email server may be accessible via the Internet to render email messages stored on the server.

With the proliferation of Internet-connected devices, email messages increasingly contain URLs referencing static content items accessible via the Internet. When an email client renders such a message, the content referenced by URLs may be automatically downloaded and displayed. Because URLs are nearly always much smaller in size than the resources they are referencing, incorporating URLs in this way facilitates broad dissemination of graphical content via email, while minimizing outgoing server bandwidth requirements and recipient email storage requirements.

In some cases, Internet-based services may use information about the recipient to customize the content or appearance of email messages. For example, a retailer sending an advertising email to a target customer list that includes individual names and email addresses, may incorporate each recipient's name into the subject line of each email in order to personalize the message and attract the recipient's attention. As another example, an apparel retailer having customer home address information conducting an advertising campaign in January may advertise snow gear to customers having a home address in Minnesota, while advertising light jackets to customers having a home address in Arizona.

However, the content of such personalized messages is typically fixed at or before the time the email message is transmitted by the originator. Therefore, if the Minnesota resident is spending the winter in Arizona, they will still view snow gear advertisements when opening the email message. Also, if there is a delay and the recipient opens the email message in March or April, they will still view snow gear advertisements, even though it may be no longer relevant to the recipient.

SUMMARY

The present disclosure describes systems and methods for publishing dynamic content via email. The dynamic content may not be determined until after the time at which the email message is transmitted to the recipient. The content can be personalized based on the user's identity, mood, behavior, topics of interest, or other factors.

Such dynamic code can be added to an email using a network reference, such as a hyperlink formed from <a href> and <img> tags containing an embedded user identifier. When the recipient's email client loads the email, the resource embodied in the hyperlink is requested. A request is transmitted to a dynamic content server, and potentially interpreted by a real-time personalization engine, before serving a selected image or other content item. The dynamically-selected images or content items are preferably stored on a Content Delivery Network for prompt service back to, and rendering by, the recipient's email client. The link for the selected content item may then be cached for the associated recipient.

Additional parameters can be included in the hyperlink, such as the <img> tag and bt_ts (i.e. request ID), to exclude resources, restrict to certain metadata fields, restrict to location, return consistent content across multiple renderings of the same email, and/or seed the personalized content based on a specific item. This provides email originators with significant control over dynamic content delivery.

In accordance with yet another aspect, an exclude service may be provided in which rules are defined to help manage content that is delivered dynamically and in real-time. For example, an advertiser may feature one item to all recipients, with several additional items being selected dynamically based on past user behavior and/or other user information. A deduplication exclude service may exclude the common featured item from the possible set of other items that may be selected dynamically for presentation, thereby avoiding the possibility of advertising the same item twice in the same email.

Various other objects, features, aspects, and advantages of the present invention and embodiments will become more apparent from the following detailed description of preferred embodiments, along with the accompanying drawings in which like numerals represent like components.

DETAILED DESCRIPTION

Figure 1:
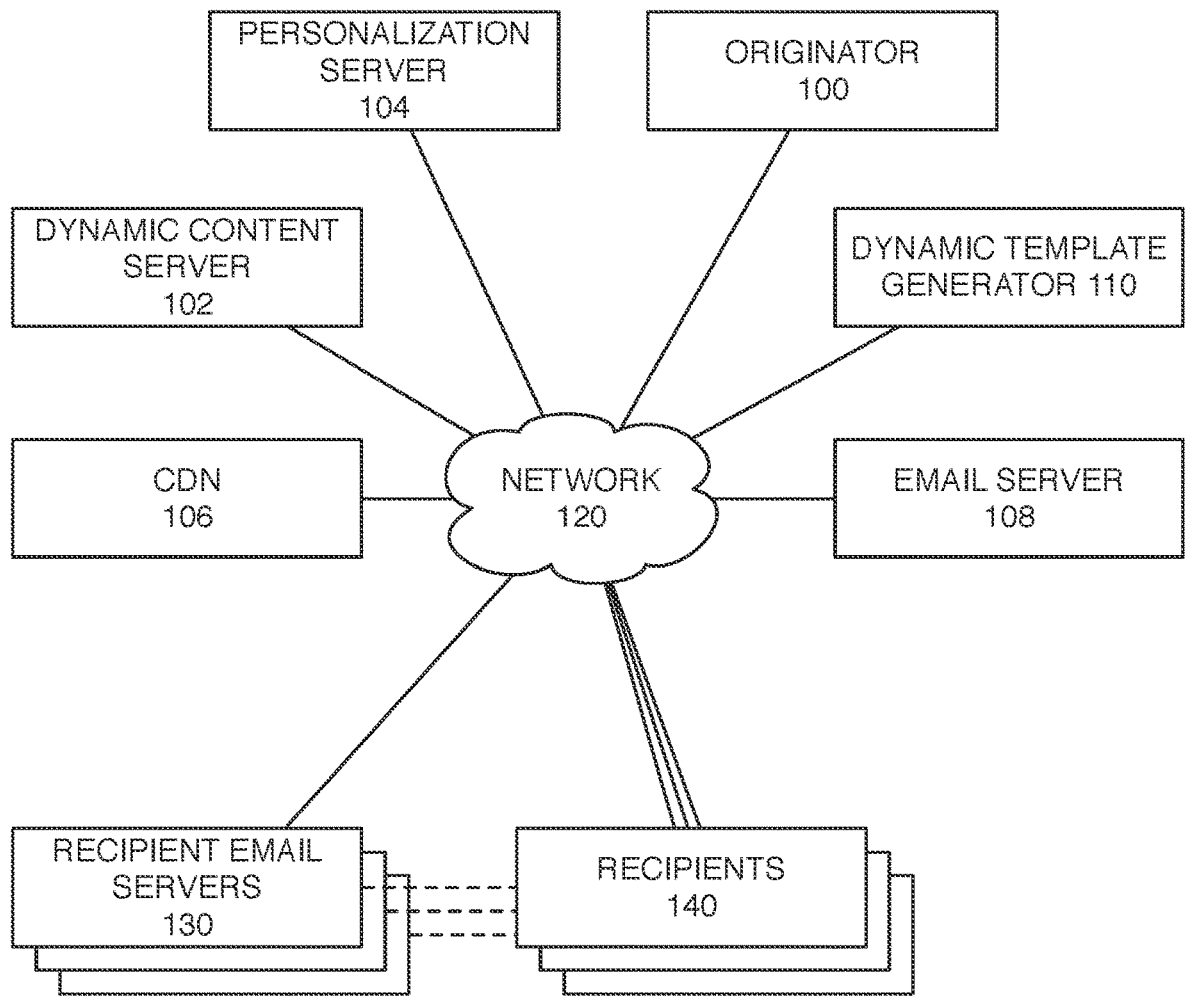
FIG. 1 is a schematic block diagram of a computing environment for disseminating email communications having dynamic content.

While this invention is susceptible to embodiment in many different forms, there are shown in the drawings and will be described in detail herein several specific embodiments, with the understanding that the present disclosure is to be considered as an exemplification of the principles of the invention to enable any person skilled in the art to make and use the invention, and is not intended to limit the invention to the embodiments illustrated.

FIG. 1 is a schematic block diagram of an embodiment of a system for delivery of email communications having dynamic content, which may, if desired, be determined as late as the time at which an email is viewed by a recipient. Originator 100 accesses dynamic template generator 110 to generate HTML content that can be encapsulated within the body of one or more email messages. Email server 108 can generate one or more email messages containing the message content from template generator 110. Originator 100, template generator 110 and email server 108 each communicate via communications network 120, which may include one or more of the Internet, Intranets, virtual networks, wireless networks and other means of conveying digital communications.

Other elements within the system of FIG. 1 include personalization server 104, dynamic content server 102, content delivery network 106, one or more recipient email servers 130, and recipient communication devices 140. Recipient devices 140 preferably include a number of individual user devices such as a personal computer, tablet computer, smart phone, smart watch, smart appliances, and other such computing devices, which may be used by individuals to access email.

Figure 2:
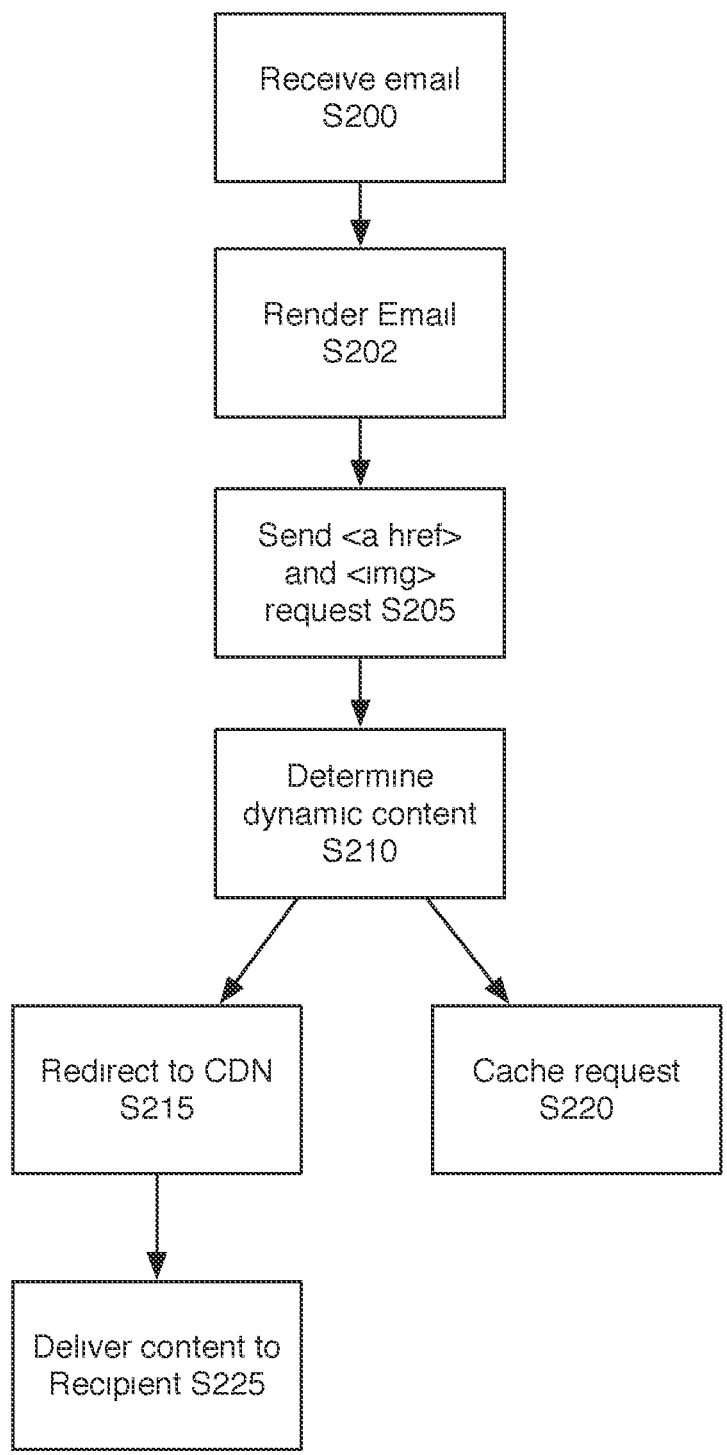
FIG. 2 is a process flow chart for displaying an email having dynamic content.

FIG. 2 is a flow chart of a process that can be implemented by the system of FIG. 1 in order to deliver dynamic content via email. In step S200, an email message is transmitted by email server 108, stored by one or more of recipient email servers 130, and eventually delivered to one or more recipient devices 140.

Figure 3:
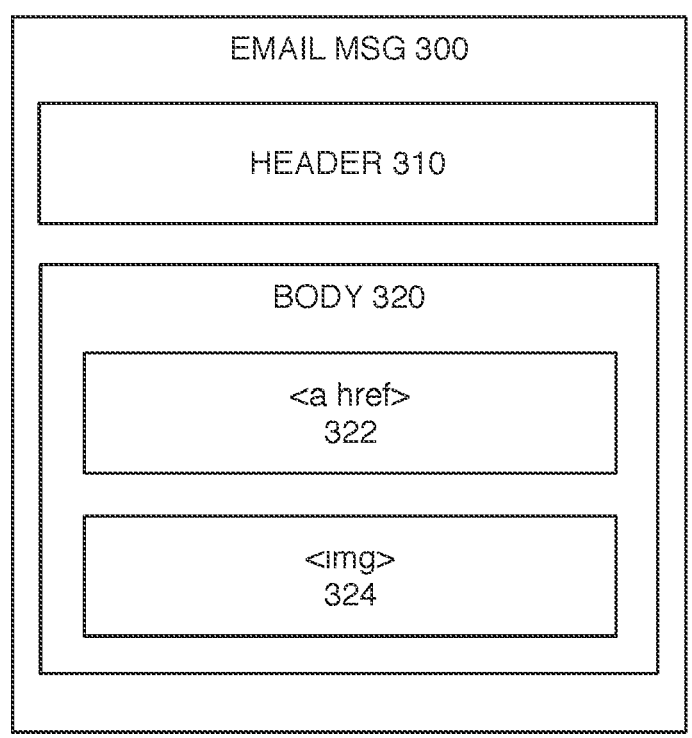
FIG. 3 is a schematic block diagram of an email message with dynamic content.

FIG. 3 is a block diagram illustrating an email message structure that may be utilized in the embodiment of FIGS. 1 and 2. Email message 300 contains header 310 and body 320, according to standard email formatting protocols. Body 320 includes HTML content having one or more content hyperlinks to dynamic content. Preferably, the hyperlinks are structured as paired sets of <a href> tags 322 and <img> tags 324. Tags 322 and 324 contain URLs that reference dynamic content server 102, but are not directly correlated with a static content item. Rather, the hyperlink request is interpreted by dynamic content server 102 to redirect to one of multiple possible content items.

Preferably, the hyperlink request is redirected to a Dynamic Image content item. A dynamic image is a generated block of content that can contain multiple parts, including image, title text, description text, call-to-action buttons and the like. In some embodiments, a Campaign Builder application (not shown, but optionally implemented by dynamic template generator 110) can enable users (such as originator 100) to easily generate dynamic image content and an associated snippet for insertion into an email. The generated snippet is preferably comprised of HTML and CSS content, and can be inserted into an email to display dynamic content comprising, e.g., a PNG image dynamically selected from amongst one or more possible PNG images based on, e.g., the email recipient's email address and the date/time that the content was sent.

For example, in one illustrative example, email message body 320 may contain the following HTML code snippet <a href="http://api.boomtrain.com/dynlink/{CLIENT_APP_ID}/%EMAILADDRESS%/{MODEL}/{REC_NUM}/{CAMPAIGN_ID}?bt_ts=%TIMESTAMP%" target="_blank"><img src="http://api.boomtrain.com/dynimg/{CLIENT_APP_ID}%EMAILADDRESS%/{MODEL}/{REC_NUM}/{CAMPAIGN_ID}.png?bt_ts=%TIMESTAMP%"/></a>

Parsing this exemplary snippet, "http://api.boomtrain.com" is the location of an API implemented by dynamic content server 102 to provide, inter alia, the functionality described above. "dynlink" and "dynimg" specify the content item being generated, and are shorthand for "dynamic link" and "dynamic image". The dynlink is wrapped around the dynimg.

"{CLIENT_APP_ID}" is the identification number for the email client or sponsor, i.e. an organization with which the email campaign is associated. This field may be advantageous for embodiments in which a single dynamic email content service provider implements systems and methods described herein, for a number of different organizations that sponsor email campaigns. The dynamic image snippet will only return content associated with the specified CLIENT_APP_ID, which may be particularly useful for centralized implementation of a dynamic content service. Including a CLIENT_APP_ID within the dynamic content reference allows dynamic content server 102, and therefore a dynamic email content service provider, to track email opens and clicks independently, for each of multiple clients or email campaign sponsors. The CLIENT_APP_ID may also serve as an API key for the client/sponsor to access the API implemented by dynamic content server 102.

"%EMAILADDRESS%" is the recipient's email address. This is inserted at the time of sending and uniquely identifies the email recipient to enable personalization or customization of content based on a particular recipient's habits. This can be filled in automatically by an email campaign builder, or manually.

{MODEL} is the type of content that is to be returned by the snippet. Originators can specify what type of content they want to display in certain sections of their email campaign and can use the model type as a filter. For example, {MODEL} types may include "article", "recipes", "blog", "obituaries", or other content type indicators that can be specified by a particular user, as appropriate to their business or use case, in order to manage and categorize the user's content.

{REC_NUM} is an incrementing recommendation number, preferably beginning at 1, of each dynamic image based on how many are displayed before it in an email campaign. Incrementing this number prevents duplication of dynamic images.

{CAMPAIGN_ID} is the identification number for the dynamic image. One originator can have multiple campaign IDs with different content or layout designs associated with each. In the "dynimg" section, this may reference a specific .png file.

bt_ts=%TIMESTAMP% is the date/time identifier for the dynamic image. Changing this number will generate new content for the recipient and will prevent image caching. This can be filled in dynamically inside an email campaign builder or manually during testing.

In some embodiments, the system of FIG. 1 may also provide a Dynamic Subject Line (DSL) route for Email Service Providers (ESPs, which in some embodiments may operate email server 108) to enable personalized email subjects based on the personalized content served in an email. Use of the DSL, which pulls the title of a personalized resource from the email, can allow each individual to have a unique subject line based on, e.g., their interests.

Using the markers available inside the Dynamic Image, ESPs can implement DSL into the email campaigns of clients who are using the dynamic content service described herein. The DSL must be generated before the recipient opens the email, so the Dynamic Image that is providing the DSL must be rendered before the campaign sends. The other Dynamic Images will still load at time of open. In an exemplary embodiment, the markers available to ESPs are as follows: % EMAILADDRESS %, % TIMESTAMP %, {CLIENT_APP_ID}, {MODEL}, and {REC_NUM}.

In step S202, email message 300 is rendered on recipient device 140. Rendering of email 300 may be accomplished via different mechanisms, as known in the art of email communications. For example, in some embodiments, a locally-installed email client implemented on recipient device 140 may render message 300 by interpreting message content locally and displaying it on a local device display. In some embodiments, such as a webmail embodiment, recipient device 140 may interact with a remote webmail server to render message 300 within a web browser application. In either case, HTML content within email message 300 is interpreted. In step S205, interpretation of href tag 322 and img tag 324 causes recipient device 140 (or whichever other device operates to interpret the message tag content) to transmit a request to dynamic content server 102 via network 120.

In step S210, dynamic content server 102 interprets the request received during step S205 to determine content that will be served to recipient 140 in response thereto. The message ID contained within the request may be utilized by dynamic content server 102 to identify a particular email content item with which the request is associated. The message ID therefore is used to determine a selection of content items from which the dynamic determination may be made (e.g. different winter clothing items available for display to a user during a clothing retailer's December advertising campaign). The UUID contained within the request may be utilized by dynamic content server 102 to identify, e.g., content believed to be of interest to a particular user associated with the UUID, or content that originator 100 desires to deliver to the particular user associated with the UUID. Identification of personalized content for delivery to a particular user may be achieved in any of a number of ways known in the art. Identification of personalized content for delivery to a particular user may also be achieved using techniques such as those described in the applicant's U.S. patent application Ser. No. 15/367,579, filed on Dec. 2, 2016, the contents of which are herein incorporated by reference. In such an embodiment, information from the request of step S205 (such as a UUID) is relayed from dynamic content server 102 to personalization server 104, and personalization server 104 return a content item ID (which may include or consist of a URL) to which the original request is redirected (as described below).

In some embodiments, a new content determination for a particular user and dynamic content item (i.e. a particular href and img tag set) is made each time the request is received; in such cases, a user may view different content each time an email is opened. In this way, an email can deliver content specifically tailored to meet a user's current interests and/or activities, potentially in near real-time.

In other embodiments, it may be desirable for dynamic content determinations to have some degree of persistence. Dynamic content determinations may persist for a period of time; e.g. dynamic content server 102 may fix a mapping of a particular href and img tag set to a particular content item, for a period of one week, such that an email is rendered with the same content for a period of one week after the first rendering; and a new content determination is made after the persistence period expires.

Persistence periods can be, inter alia, fixed for all users, determined dynamically for each user, or determined dynamically based at least in part on the content item dynamically associated with the request.

In step S215, the request from step S205 is redirected to a content item identified in step S210, the content item preferably made available via content delivery network (CDN) 106. The dynamically identified content item is then delivered from CDN 106 to recipients 140 via network 120.

Meanwhile, in step S220, dynamic content server 102 caches the association between the request in step S205 and the content with which the request is associated in step S210. The request/content association stored in step S220 may be utilized to enable content persistence, as described above, or for other purposes.

In some embodiments, it may be desirable to not only select a content item subject matter dynamically, but also select its display size. Embodiments using <a href><img> tag sets will return image content. It may be desirable to store (such as within CDN 106) multiple versions of each asset that may be returned, having different image sizes (i.e. resolutions) for different viewing devices (such as mobile phone, tablet, or PC). Dynamic content server 102 can then use browser type and size information inherent in HTML requests to redirect the incoming request in step S215 to a content item having image size appropriate for the user's current device display. In other embodiments, the multiple versions or each asset may differ not only in image size, but also aspect ratio and content, in order to optimize the displayed content item for the viewing device.

In some circumstances, dynamic content determinations can also incorporate other information inherent in the HTML request of step S205. For example, in step S210, dynamic content server 102 may detect the originating IP address of recipient 140, and perform a location lookup. The location associated with the user's IP address may then be utilized in making the dynamic content determination in step S210. In this way, a user who normally lives in one location but has, e.g., a vacation home in another location, may receive content tailored to their current location. Such location-based content determinations may include things such as locally relevant news items, or advertisements for goods and services relevant to the user's current location at the time the email is viewed.

Using techniques described herein, emails can be transmitted to users having content templates and styling set at the time of transmission, but for which some or all email content is not determined until such time as the user actually views the email. Methods and systems described herein can be utilized to transmit dynamic content using any standard outbound email service, avoiding a need for a business to switch to a different email service to take advantage of the described functionality. Also, recipients can view dynamic content using any standard email client and service, without requiring special applications, plug-ins or extensions.

The methods and apparatus described herein can be utilized in a number of different applications. For example, real-time A/B testing (also referred to as split testing) campaigns can be executed via email. Traditionally, A/B or split testing in email campaigns involve pre-assigning batches of users to each of multiple different email templates. Different emails are sent to different groups of users, and response rates are evaluated after sending. In such circumstances, the results of such testing cannot be utilized to impact user messaging until a subsequent batch of emails is sent. Therefore, email content that performs badly will continue to be viewed by all users to whom that content was originally sent, before the poor performance was identified.

Figure 5:
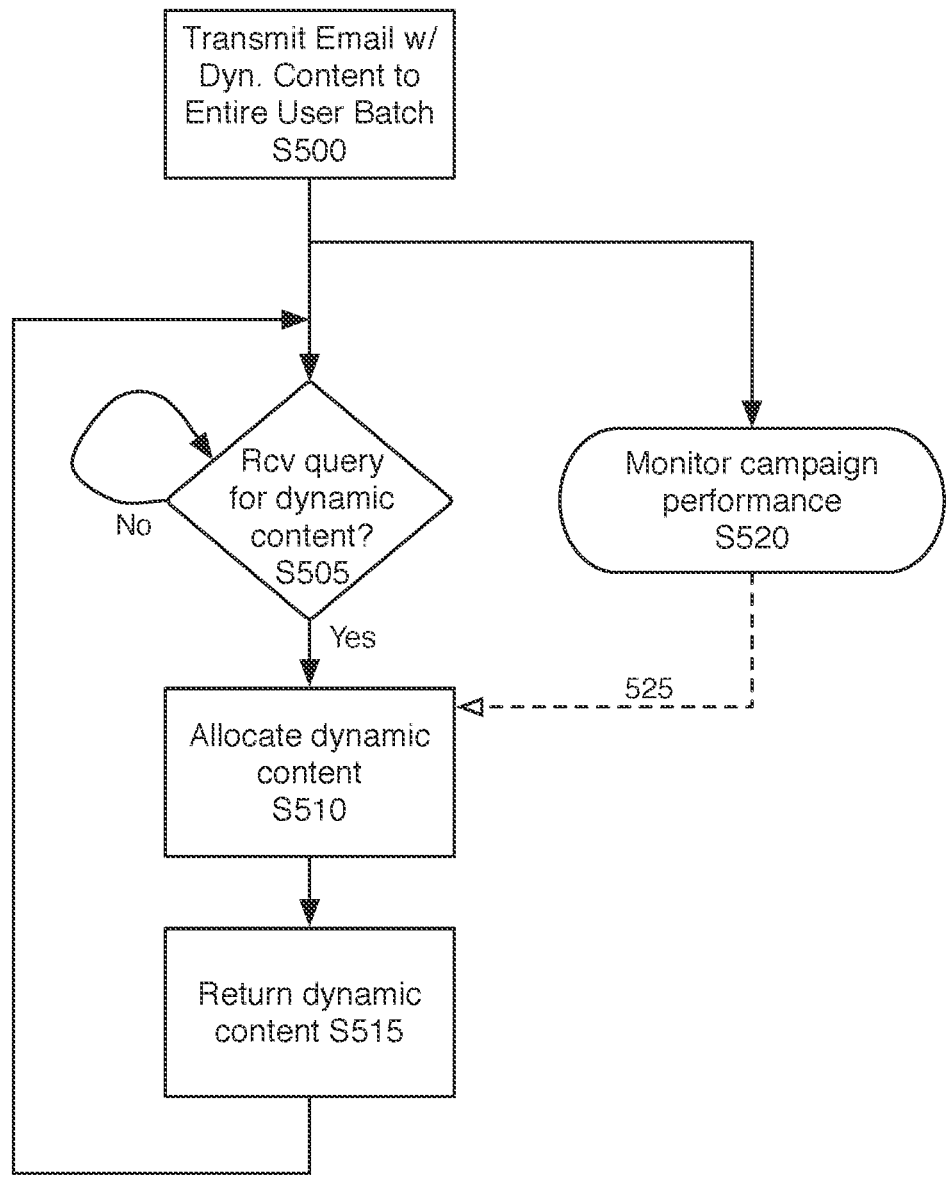
FIG. 5 is a process flow chart for dynamic split testing of email content.

By contrast, systems described herein may be used for split testing in a manner that enables dynamic, real-time adjustment of content mix. FIG. 5 illustrates an exemplary embodiment of a process for A/B testing emails using dynamic email content. In step S500, a single email template is sent by email server 108 to an entire batch of users (optionally including different UUID and/or message IDs embedded therein). In step S505, dynamic content server 102 awaits queries for dynamic content as recipients render the emails sent in step S500 on their respective personal electronic devices (analogous to steps S202 and S205 in the process of FIG. 2). In step S510, dynamic content server 102 allocates different content to different users in real-time, as the messages are viewed (e.g. analogous to step S210 of FIG. 2). For example, in step S510, dynamic content server 102 may initially serve one of two content options according to a preliminary statistical distribution (e.g. 50% option A, 50% option B). In step S520, dynamic content server 102 continually monitors the performance of opened emails over the duration of a campaign, such as a click-through-rate on a call-to-action presented in the email, where the call-to-action may include, e.g., a hyperlink having a reference that can be associated by dynamic content server 102 with the specific content presented to the user. Dynamic content server 102 may thereby monitor the performance of each content variation.

Feedback loop 525 enables dynamic content server 102 to adjust the way in which it allocated dynamic content, in real time. If a particular content item is deemed to be performing well in step S520, dynamic content server 102 can operate to automatically allocate a greater proportion of content requests to the highest-performing content. Similarly, if a particular content item is deemed to be performing poorly, dynamic content server 102 can operate to automatically allocate a smaller proportion of content requests to the poorly-performing content, or eliminate that content from display altogether. By using dynamic content serving techniques as described herein, such adjustments can be made in real-time, even after the original transmission of the emails.

Figure 4:
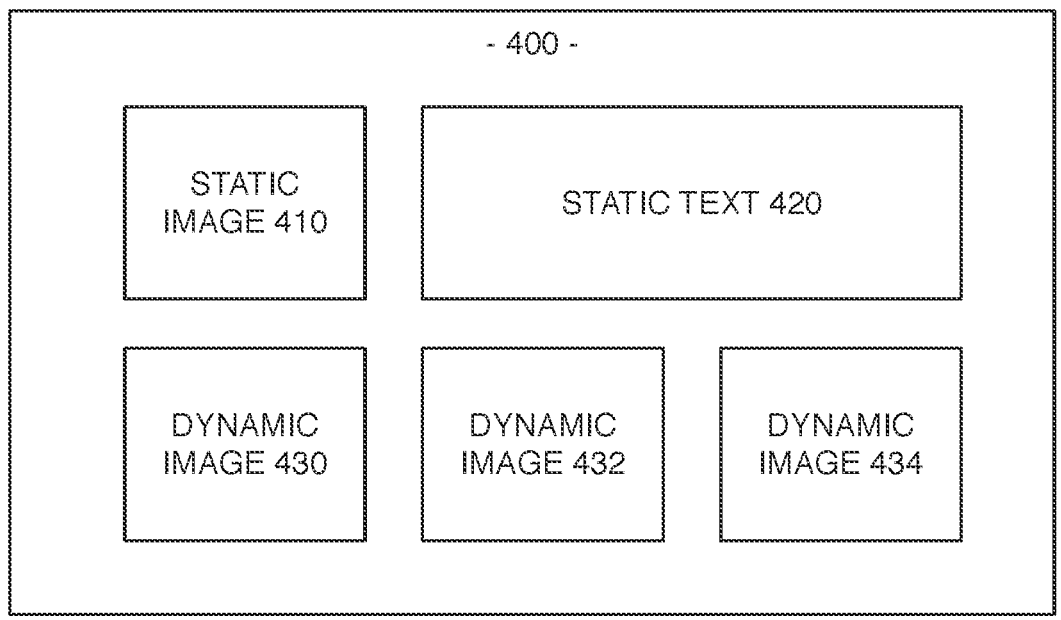
FIG. 4 is an email message template having static and dynamic content.

In some circumstances, it may be desirable to integrate business rules into the dynamic content determination of step S210. For example, FIG. 4 illustrates an email advertisement having a template with static image 410 and static text 420, such as may be useful to, e.g., advertise a featured item that the advertiser desires to display to all recipients of the email. The same email contains multiple other content items 430, 432 and 434, which are determined dynamically, such as a selection of three items that are believed to be most desirable for the specific recipient of email 400 (for example, as determined by personalization server 104). Each of dynamic content items 430, 432 and 434 includes a <a href><img> tag set having unique IDs embedded therein. Absent additional constraints, for some users, personalization server 104 may select content for one of dynamic content items 430, 432 or 434, which is the same as static content item 410. To the extent it may be undesirable to display duplicate content, additional business rules may be applied to deduplicate dynamic content items relative to other content presented in a communication. In the advertising example, an exclude rule may be desirable, to exclude the content item associated with static image 410 from selection for one of dynamic content items 430, 432 and 434.

In some embodiments, the exclude service may be implemented by dynamic content server 102, by cross-referencing dynamic content selections from personalization server 104 with static content associated with a unique ID embedded within a request; if dynamic content server 102 determines that a dynamic content selection is duplicative of a static content item within the same communication for which the dynamic content item is being returned, an alternative (non-duplicative) content item can be served in response to the dynamic request.

In other embodiments, the exclude service may be implemented by personalization server 104. For example, dynamic content server 102 may pass identification of static content items to be excluded to personalization server 104, along with the personalization request, in step S210. Personalization server 104 may exclude the identified static content items from the pool of available content items for selection in response to a dynamic content item request, such that personalization server 104 does not return a content item ID that is duplicative of a static content item within the same communication.

While certain embodiments of the invention have been described herein in detail for purposes of clarity and understanding, the foregoing description and Figures merely explain and illustrate the present invention and the present invention is not limited thereto. For example, while the dynamic content server, personalization server and content delivery network are illustrated separately in FIG. 1, it is understood that in other embodiments, the operations implemented by these components can alternatively be implemented as modules within a single computing system. It will be appreciated that those skilled in the art, having the present disclosure before them, will be able to make these and other modifications and variations to that disclosed herein without departing from the scope of any claims.

The invention claimed is:

1. A computer-implemented method for sending email messages with dynamically-determined content, the method comprising:
    transmitting email messages to a plurality of recipient devices, each message comprising one or more dynamic content network references associated with dynamically-selected content items;
    receiving, by a network-connected server, a dynamic content network request from a recipient device, the dynamic content network request comprising one or more content selection criteria, the content selection criteria comprising an embedded user identifier uniquely associated with a user to whom an email among the email messages was transmitted;
    dynamically selecting a content item from amongst a plurality of candidate content items based at least in part on the content selection criteria;
    implementing an exclusion service by cross-referencing a dynamic content item with static content associated with the embedded user identifier and, based on a determination that the dynamic content item is duplicative of an associated static content item within a same email communication, serving an alternative non-duplicative content item in response to the dynamic content request; and
    returning the selected or the alternative content item to the email recipient device for rendering within the same email communication.

2. The method of claim 1, in which each dynamic content network reference comprises a URL.

3. The method of claim 1, in which each dynamic content network reference comprises a HTML <a href> tag and <img> tag.

4. The method of claim 1, in which the content selection criteria comprise data indicative of a location of the recipient device.

5. The method of claim 1, in which the content selection criteria comprise data indicative of a display size of the recipient device.

6. The method of claim 1, in which the content selection criteria comprise a browser type indicator.

7. The method of claim 1, in which the step of dynamically selecting a content item comprises:
relaying at least a portion of information contained within the dynamic content network request from a dynamic content server to a personalization server; and
selecting a content item by the personalization server based at least in part on information within the relayed request.

8. The method of claim 1, in which the step of returning the selected content item comprises returning to the email recipient device a network redirect to a content item hosted by a content delivery network.

9. The method of claim 1, further comprising:
caching an association between the dynamic content network request and the selected content item provided in response to the request;
subsequently receiving a dynamic content item network request from the same recipient; and
returning the previously-selected content item to the email recipient device in response to the subsequent request.

10. The method of claim 1, in which:
the plurality of candidate content items comprises image content items having different sizes; and
the step of dynamically selecting a content item from amongst a plurality of candidate content items comprises selecting an image content item based at least in part on an indication of recipient display size embedded within the network request.

11. The method of claim 1, in which:
each email message is associated with one of a plurality of dynamic email content service provider clients;
the network request comprises a client ID uniquely associated with one of the plurality of recipient devices: and
the step of dynamically selecting a content item comprises selecting a content item from amongst a plurality of candidate content items associated with the network request client ID.

12. The method of claim 1, in which the content selection criteria comprise a content type filter.

13. The method of claim 1, the method further comprising:
causing a rendering, by the recipient device, of the selected content item in combination with predetermined content contained within and/or referenced by the email message that was determined prior to the step of transmitting email messages.

14. The method of claim 13, in which the predetermined content comprises a dynamic subject line rendered by an image personalized for the email recipient and selected prior to the step of transmitting email messages.

15. The method of claim 1, further comprising the step of caching an association between the dynamic content network request and the content item selected in response thereto;
and in which the step of dynamically selecting a content item from amongst a plurality of candidate content items based at least in part on the content selection criteria comprises substeps including:
determining that a content item has previously been selected in response to the dynamic content network request;
if a persistence time period has not expired, selecting the same content item previously selected in response to the dynamic content network request; and
if the persistence time period has expired, selecting a content item in response to the dynamic content network request without regard to prior content item selections.

16. The method of claim 15, in which the persistence period is a time period between the current time and the time at which a content item was last selected without regard to prior content item selections.

17. The method of claim 15, in which the persistence period is predetermined for all email recipient devices.

18. The method of claim 15, in which the persistence period is determined dynamically for each user.

19. The method of claim 15, in which the persistence period is determined dynamically based at least in part on the content item previously selected.

20. The method of claim 1, in which each email message further comprises one or more static content items and the content selection criteria comprise a message identifier; and
in which the step of dynamically selecting a content item from amongst a plurality of candidate content items based at least in part on the content selection criteria comprises substeps including:
identifying the static content items based on the message identifier; and
excluding the static content items from the plurality of candidate content items available for return.

* * * * *